(12) United States Patent
Ohara

(10) Patent No.: US 8,777,266 B2
(45) Date of Patent: Jul. 15, 2014

(54) STEERING DEVICE

(75) Inventor: Yoshihide Ohara, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/976,185

(22) PCT Filed: Jan. 6, 2012

(86) PCT No.: PCT/JP2012/050146
§ 371 (c)(1),
(2), (4) Date: Jun. 26, 2013

(87) PCT Pub. No.: WO2012/093713
PCT Pub. Date: Jul. 12, 2012

(65) Prior Publication Data
US 2013/0298718 A1      Nov. 14, 2013

(30) Foreign Application Priority Data

Jan. 6, 2011   (JP) .................. 2011-001471

(51) Int. Cl.
*B62D 1/187* (2006.01)
*B62D 1/189* (2006.01)
*B62D 1/18* (2006.01)

(52) U.S. Cl.
CPC ............... *B62D 1/187* (2013.01); *B62D 1/189* (2013.01); *B62D 1/18* (2013.01)
USPC ...................................... 280/775

(58) Field of Classification Search
CPC ........... B62D 1/187; B62D 1/189; B62D 1/18
USPC .................................................. 280/775, 779
See application file for complete search history.

(56) References Cited

U.S. PATENT DOCUMENTS

| | | | | |
|---|---|---|---|---|
| 5,743,151 | A  * | 4/1998 | Khalifa et al. | 74/493 |
| 5,992,263 | A  * | 11/1999 | Bleuel et al. | 74/493 |
| 6,443,650 | B2 * | 9/2002 | Ikeda | 403/12 |
| 7,275,458 | B2 * | 10/2007 | Kinme et al. | 74/493 |
| 7,328,917 | B2 * | 2/2008 | Sawada et al. | 280/775 |
| 7,607,694 | B2 * | 10/2009 | Shinohara et al. | 280/775 |
| 7,658,125 | B2 * | 2/2010 | Inayoshi et al. | 74/493 |

(Continued)

FOREIGN PATENT DOCUMENTS

| | | |
|---|---|---|
| JP | Y2-62-018125 | 5/1987 |
| JP | Y2-63-004678 | 2/1988 |

(Continued)

OTHER PUBLICATIONS

International Search Report issued in Application No. PCT/JP2012/050146; Dated Apr. 10, 2012 (With Translation).

*Primary Examiner* — Nicole Verley
(74) *Attorney, Agent, or Firm* — Oliff PLC

(57) ABSTRACT

First and second lower support mechanisms (27, 28): are each provided with a coil spring (66, 86) that is mated to the outer periphery of an axle part (59, 79) of a fulcrum bolt (53, 73); and are configured in such a manner that support brackets (51, 71) are able to rock with respect to a steering column (5) by compressing the coil springs (66, 86). The coil springs (66, 86) are formed in such a manner that the axle parts (59, 79) are force fitted in a state prior to column-side fastening parts (55, 75) being fastened to the steering column (5).

3 Claims, 7 Drawing Sheets

(56) References Cited

U.S. PATENT DOCUMENTS

| | | | |
|---|---|---|---|
| 7,861,615 B2* | 1/2011 | Harris et al. | 74/493 |
| 8,235,420 B2* | 8/2012 | Moriyama et al. | 280/777 |
| 8,485,554 B2* | 7/2013 | Osuka et al. | 280/777 |
| 8,601,901 B2* | 12/2013 | Ishii et al. | 74/493 |
| 8,651,526 B2* | 2/2014 | Nakamura et al. | 280/777 |
| 8,678,435 B2* | 3/2014 | Sakata | 280/775 |
| 2003/0168843 A1* | 9/2003 | Ryne et al. | 280/779 |
| 2004/0134302 A1* | 7/2004 | Ko et al. | 74/493 |
| 2006/0043722 A1* | 3/2006 | Hoshino et al. | 280/777 |
| 2006/0097501 A1* | 5/2006 | Yoshimoto et al. | 280/777 |
| 2007/0127982 A1* | 6/2007 | Bohlen et al. | 403/119 |
| 2009/0205458 A1* | 8/2009 | Clark et al. | 74/493 |
| 2010/0243368 A1* | 9/2010 | Suzuki | 180/444 |
| 2014/0026707 A1* | 1/2014 | Yokota et al. | 74/493 |

FOREIGN PATENT DOCUMENTS

| | | |
|---|---|---|
| JP | A-2001-315649 | 11/2001 |
| JP | A-2006-062434 | 3/2006 |
| JP | A-2009-113726 | 5/2009 |
| JP | A-2009-113727 | 5/2009 |
| JP | A-2010-137665 | 6/2010 |

* cited by examiner

Prior Art

STEERING DEVICE

TECHNICAL FIELD

The invention relates to a steering device for a vehicle.

BACKGROUND ART

A steering device has been known which has a tilt function of enabling a height position of a steering wheel to be adjusted depending on a physical size of a driver and the like. In the steering device, a steering column that rotatably supports a steering shaft is tiltably supported to a vehicle main body and a tilt angle of the steering column is changed to adjust the height position of the steering wheel.

A support structure of a fulcrum part of the steering column has been known which is supported to the vehicle main body via a pair of support mechanisms provided at both sides of the vehicle in a left-right direction (for example, refer to Patent Document 1).

In the steering device of Patent Document 1, as shown in FIG. 9, each support mechanism 91 includes a substantially L-shaped support bracket 96 having a column-side fastening part 93 that is tiltably fastened to a steering column 92 and a vehicle body-side fastening part 95 that is fastened to a fixing member 94 fixed to a vehicle main body. Also, the support mechanism 91 includes a fulcrum bolt 98 that is inserted into an axle hole 97 formed in the column-side fastening part 93, a collar 99 that is fitted to an outer side of the fulcrum bolt 98 and a cylindrical bush 100 that is interposed between the collar 99 and the axle hole 97. The bush 100 is made of a resin material having an excellent sliding property and is configured so that the collar 99 (fulcrum bolt 98) is rotatably inserted therein. In the meantime, the bush 100 has a cylindrical part 101 and flange parts 102 that extends from both axial ends of the cylindrical part in a diametrically outer direction.

In the support bracket 96, the column-side fastening part 93 is fastened to the steering column 92 by the fulcrum bolt 98 and the vehicle body-side fastening part 95 is fastened to the fixing member 94 by a fastening bolt 103. Thereby, the steering column 92 is tiltably supported to the vehicle main body about the fulcrum bolt 98 by the support mechanism 91.

CITATION LIST

Patent Documents

Patent Document 1: JP-A-2009-113726

SUMMARY OF INVENTION

Technical Problem

However, as shown with the dashed-two dotted line in FIG. 9, for example, the fixing member 94 is deviated from a normal position (a position in a case where there is no processing error and the like) due to processing precision, mounting precision to the vehicle main body and the like, so that a fastening surface 94a of the fixing member 94 before the fastening becomes non-parallel with (is inclined to) a fastening surface 95a of the vehicle body-side fastening part 95 arranged at the normal position. When the fastening surface 94a and the fastening surface 95a are not parallel with each other, the support bracket 96 may be deformed or deform the cylindrical part 101 and flange parts 102 of the bush 100 upon the fastening of the support bracket 96 to the fixing member 94, so that the support bracket 96 is oscillated. As a result, an axial force of the fastening bolt 103 is counterbalanced by stress, which is accompanied by the deformation of the support bracket 96 or bush 100, so that the fastening force of the support bracket 96 to the fixing member 94 is weakened. Therefore, taking into consideration the reduction of the axial force, a design of increasing the fastening force or selecting a bolt having a thickness capable of withstanding the fastening force should be made, which increases the cost.

The invention has been made to solve the above problem, and an object of the invention is to provide a steering device capable of suppressing an axial force of a fastening bolt from being reduced.

Solution to Problem

In order to achieve the above object, a steering device of the invention has features of following (1) to (3).

(1) A steering device comprising:

a steering column that rotatably supports a steering shaft to which a steering wheel is connected; and a pair of support mechanisms that tiltably supports the steering column relative to a vehicle main body, wherein each of the support mechanisms includes:

a support bracket having a column-side fastening part that is tiltably fastened to the steering column and a vehicle body-side fastening part that is fastened to a fixing member fixed to the vehicle main body;

a fulcrum bolt that is inserted into an axle hole formed in the column-side fastening part, becomes a fulcrum upon tilting of the steering column and fastens the column-side fastening part to the steering column; and a bush that is interposed between the fulcrum bolt and the axle hole, wherein the vehicle body-side fastening part is formed with a fastening hole into which a fastening bolt for fastening the support bracket to the fixing member is inserted, wherein each of the support mechanisms includes an elastic member that is fitted to an outer periphery of an axle part of the fulcrum bolt, and is configured to oscillate relative to the steering column as the support bracket compresses the elastic member in an axial direction of the fulcrum bolt, and wherein the elastic member that is provided to at least one of the support mechanisms is formed so that the axle part is press-fitted thereto at a state before the column-side fastening part is fastened to the steering column.

According to the above configuration (1), even when the fixing member is deviated from a normal position due to processing precision and the like, since the support bracket axially compresses the elastic member and oscillates relative to the steering column upon the fastening of the support bracket to the fixing member, it is possible to suppress the deformation of the support bracket. Also, at this time, since the elastic member is axially compressed, the support bracket can oscillate without deforming the flange part of the bush, unlike the related art. Therefore, it is possible to suppress an axial force of the fastening bolt from being reduced and it is not necessary to make a design reflecting the reduction of the axial force, so that it is possible to reduce the cost. In the above configuration, since the elastic member is formed so that the axle part of the fulcrum bolt is press-fitted thereto, it is difficult for the elastic member to separate from the axle part. Thereby, when mounting the support bracket, it is possible to prevent the elastic member from separating (coming out) from the axle part, thereby improving the mounting ability.

(2) In the steering device described in the above (1), preferably, the axle part of the fulcrum bolt that is provided to at least one of the respective support mechanisms is formed to have an outer diameter larger than that of a screw part of the fulcrum bolt, and a connection end portion of the axle part with the screw part is tapered.

According to the above configuration (2), since the connection end portion of the axle part is tapered, it is possible to easily press-fit the axle part to the elastic member, thereby further improving the mounting ability.

(3) In the steering device described in the above (2), preferably, the fulcrum bolt is screwed into a screw hole formed in the steering column so as to fasten the column-side fastening part to the steering column, the elastic member that is provided to one of the support mechanisms is arranged between the column-side fastening part and the steering column, and the elastic member that is provided to the other of the support mechanisms is arranged between the column-side fastening part and a head part of the fulcrum bolt, the connection end portion of the fulcrum bolt that is provided to each support mechanism is tapered, and the screw hole of the steering column is formed at a surrounding thereof with a recess part into which the connection end portion of the fulcrum bolt provided to the other of the support mechanisms is inserted.

According to the above configuration (3), since the elastic member that is provided to the one support mechanism is arranged between the column-side fastening part and the steering column, i.e., at a side of the column-side fastening part facing the steering column, the elastic member urges the steering column towards the other support mechanism. Also, since the elastic member that is provided to the other support mechanism is arranged between the column-side fastening part and the head part of the fulcrum bolt, i.e., at a side of the column-side fastening part opposite to the steering column, the elastic member urges the steering column towards the other support mechanism via the fulcrum bolt. That is, in the above configuration, the steering column is pressed towards the other support mechanism (support bracket). Hence, even when the respective members configuring the support mechanism are worn by the using over the long term and an axial gap is thus caused between the steering column and each support bracket, it is possible to suppress the steering column from rattling.

Here, when the tapered connection end portion is arranged in the bush, the fulcrum bolt may rattle in the bush. In the above configuration, since the steering column is pressed towards the support bracket provided to the other support mechanism, the bush is arranged at the connection end portion-side of the axle part of the fulcrum bolt and the fulcrum bolt is apt to rattle in the other support mechanism.

Regarding the above, according to the above configuration, since the connection end portion of the other fulcrum bolt is inserted into the recess part formed in the steering column, even when the connection end portion is tapered, the fulcrum bolt is difficult to rattle in the bush, so that the steering column can be stably supported. Thereby, while stably supporting the support bracket, it is possible to easily press-fit the axle part to the elastic member by tapering the connection end portions of each fulcrum bolt.

Advantageous Effect of Invention

According to the invention, it is possible to provide a steering device capable of suppressing an axial force of a fastening bolt from being reduced.

DESCRIPTION OF EMBODIMENTS

Hereinafter, an illustrative embodiment of the invention will be described with reference to the drawings.

Figure 1:
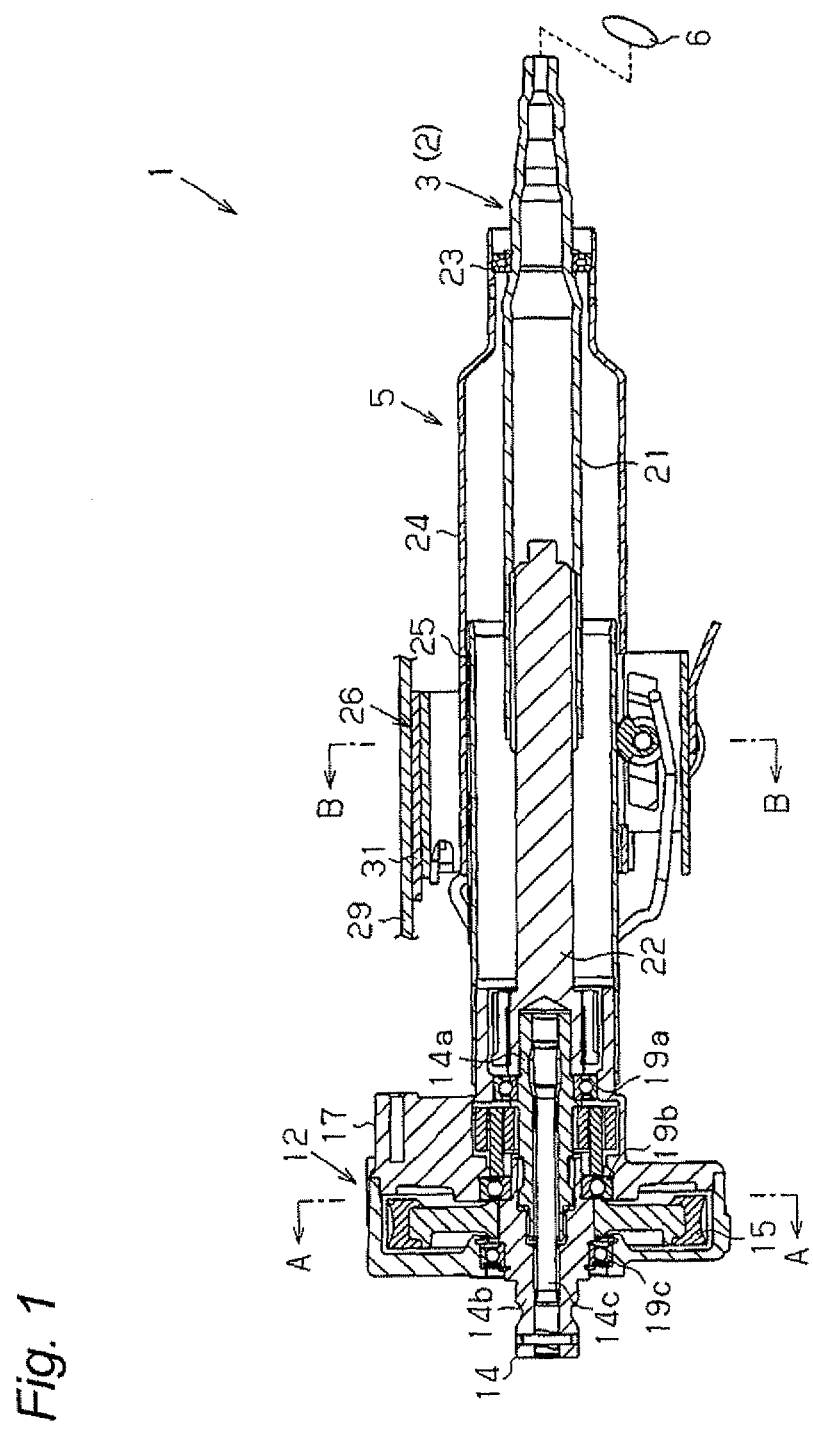
FIG. 1 is a sectional view showing a vicinity of a steering column of a steering device according to an illustrative embodiment of the invention.

As shown in FIG. 1, in a steering device 1, a column shaft 3 configuring a steering shaft 2 is rotatably accommodated in a steering column 5. A steering wheel 6 is fixed to an end portion (a right end portion in FIG. 1) of the column shaft 3 at a vehicle rear-side. In the meantime, an end portion (a left end portion in FIG. 1) of the column shaft 3 at a vehicle front-side is connected with an intermediate shaft via a universal joint, which are not shown. Rotation and steering torque, which are accompanied by a steering operation, are transmitted to a steering mechanism such as rack and pinion mechanism and the like that changes a steering angle of the steering wheel. In the meantime, the steering shaft 2 is mounted to a vehicle with being inclined so that an end portion thereof at the vehicle front-side is positioned at a lower side in an upper-lower direction of the vehicle.

Figure 2:
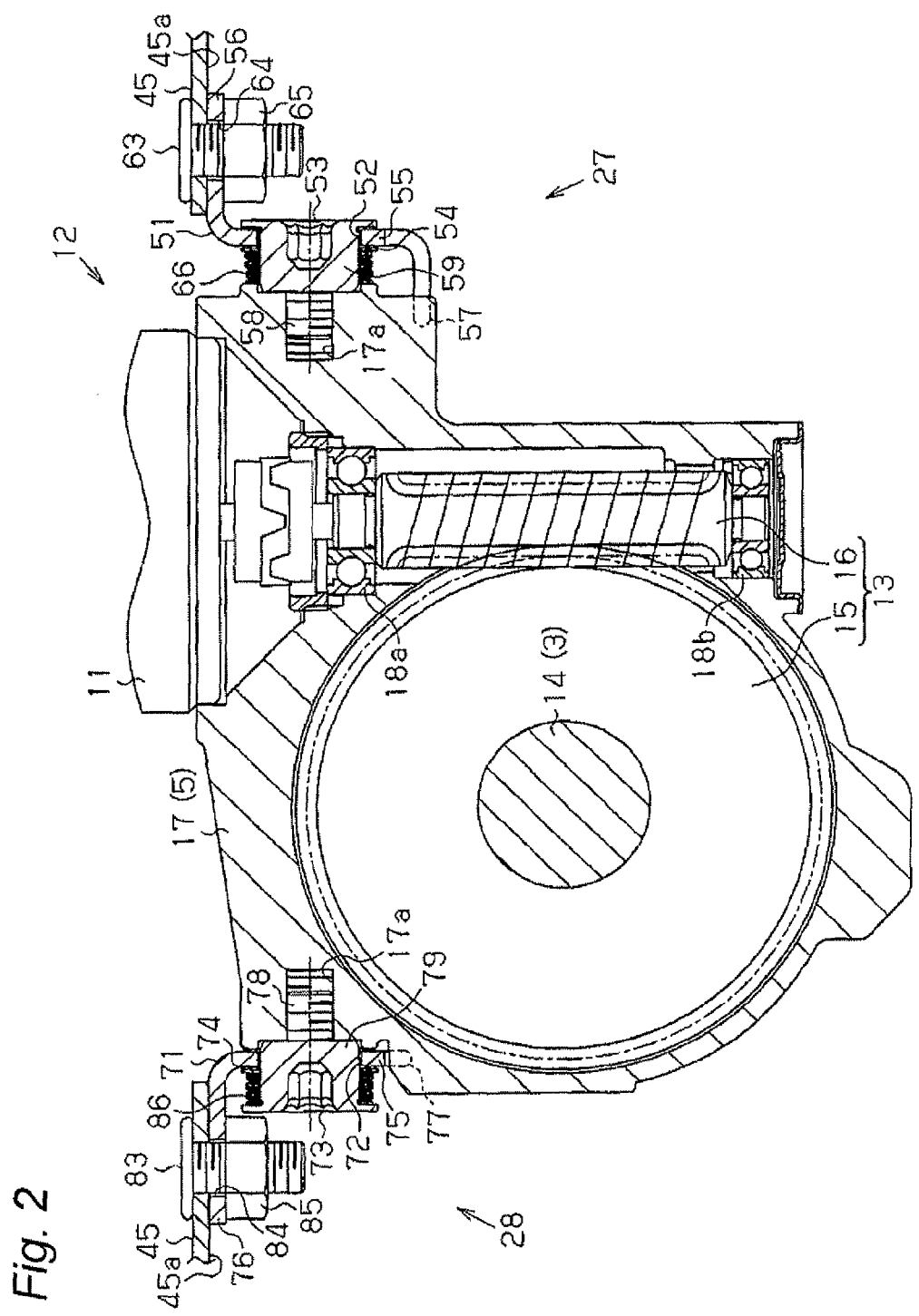
FIG. 2 is a sectional view taken along a line A-A of FIG. 1.

Also, the steering device 1 is configured as an electric power steering device (EPS) of a so-called column assist-type that rotates the column shaft 3 while using a motor as a driving source. Specifically, as shown in FIGS. 1 and 2, the steering device 1 has an EPS actuator 12 that applies an assist force for assisting a steering operation to a steering system while using a motor 11 as a driving source. The motor 11 that is the driving source of the EPS actuator 12 is driving-connected to an output axle 14, which configures a part of the column shaft 3, via a deceleration mechanism 13. In the meantime, the deceleration mechanism 13 is configured by engaging a worm wheel 15 connected to the output axle 14 and a worm axle 16 connected to the motor 11 with each other. The deceleration mechanism 13 and the output axle 14 are accommodated in a housing 17 that configures a part of the steering column 5.

Specifically, as shown in FIG. 2, the motor 11 is fixed to the housing 17 so that a motor axis is orthogonal to the output axle 14. Also, the worm axle 16 connected to the motor 11 has both ends that are rotatably supported by bearings 18a, 18b provided in the housing 17 and is engaged with the worm wheel 15 connected to the output axle 14. As shown in FIG. 1, the output axle 14 is rotatably supported by bearings 19a to 19c provided in the housing 17. The EPS actuator 12 is configured to decelerate the rotation of the motor 11 by the deceleration mechanism 13 and to transmit the decelerated rotation to the output axle 14, thereby applying the assist force to the steering system.

Also, the steering device 1 has a telescopic function capable of adjusting a front-rear position of the steering wheel 6 (an axial steering position of the steering shaft 2). Specifically, the column shaft 3 of this illustrative embodiment has a first axle 21 having a hollow shape to which the steering wheel 6 is fixed and which configures the end portion of the column shaft 3 facing the steering wheel 6 and a second axle 22 that is spline-fitted to the first axle 21 and can be thus axially moved relative to the first axle 21. The column shaft 3 is configured by connecting the output axle 14 to the second axle 22 connected to the first axle 21. In the meantime, the output axle 14 is configured by connecting an upper shaft 14a, which is connected to the second axle, and a lower shaft 14b, to which the worm wheel 15 is fixed and which is connected to the intermediate shaft, via a torsion bar 14c.

In the meantime, the steering column 5 of this illustrative embodiment has an outer tube 24 that accommodates the first axle 21 via a bearing 23 and an inner tube 25 that accommodates the second axle 22. The inner tube 25 is inserted into an inner periphery of the outer tube 24, so that the outer tube can be axially slid relative to the inner tube 25. The steering column 5 is configured by connecting the housing 17, which accommodates therein the EPS actuator 12, to the inner tube 25 connected to the outer tube 24. The steering device 1 configured as described above has a configuration where an axial steering position thereof can be adjusted by moving the outer tube 24 and the first axle 21 relative to the inner tube 25 and the second axle 22.

Figure 3:
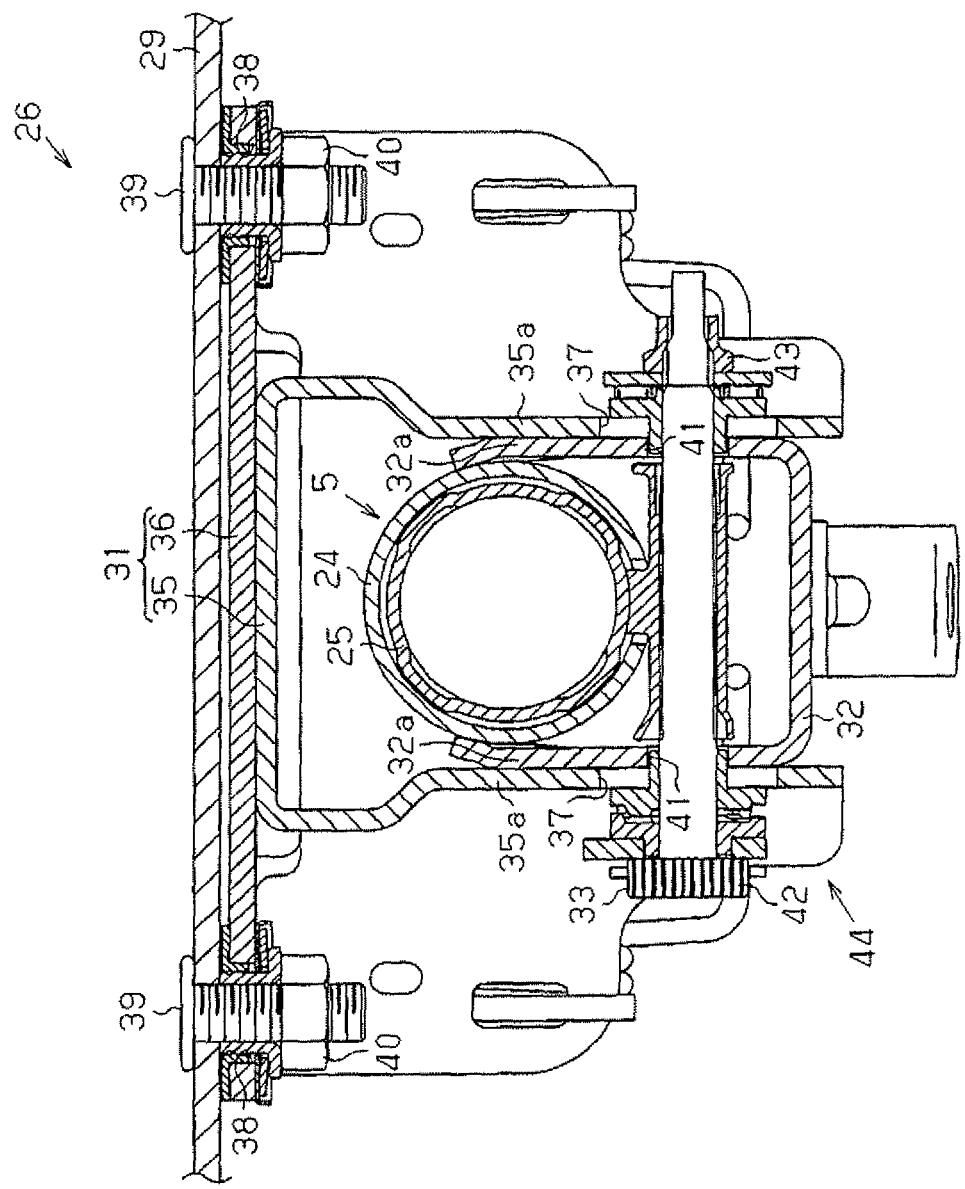
FIG. 3 is a sectional view taken along a line B-B of FIG. 1.

Also, the steering device 1 has a tilt function of enabling a height position of the steering wheel 6 (a steering position in the upper-lower direction of the vehicle) to be adjusted. Specifically, as shown in FIGS. 1 to 3, the steering column 5 is tiltably supported to the vehicle main body by an upper support mechanism 26 and a pair of first and second lower support mechanisms 27, 28. By tilting the column shaft 3 together with the steering column 5, the steering position in the upper-lower direction of the vehicle can be adjusted.

As shown in FIG. 3, the upper support mechanism 26 has a vehicle body-side bracket 31 that is fixed to a fixing member 29 fixed to the vehicle main body, a column-side bracket 32 to which the steering column 5 (outer tube 24) is fixed and a support axle 33 that connects the vehicle body-side bracket 31 and the column-side bracket 32 with each other.

The vehicle body-side bracket 31 has a clamp 35 having a substantial U shape, when seen from the axial direction of the steering shaft 2, and a flat plate-shaped plate 36 that is fixed to an upper end of the clamp 35. A pair of side plate parts 35a that is provided to the clamp 35 is formed with substantially arc-shaped tilt long holes 37 along the tilt direction of the steering column 5, respectively. A nut 40 is screwed to a fastening bolt 39 inserted into a fastening hole 38 of the plate 36, so that the vehicle body-side bracket 31 is fastened to the fixing member 29.

The column-side bracket 32 has a substantial U shape, when seen from the axial direction of the steering shaft 2, and the side plate parts 32a provided to the column-side bracket 32 are formed with telescopic long holes 41 along the axial direction, respectively.

The support axle 33 has an axle shape and is formed at a base end-side (a left side in FIG. 3) with a disc-shaped head part 42. The support axle 33 is inserted into the tilt long holes 37 and the telescopic long holes 41 with the column-side bracket 32 being arranged at the inside of the vehicle body-side bracket 31 and the nut 43 is screwed to a leading end-side thereof (a right side in FIG. 3), so that the support axle connects the vehicle body-side bracket 31 and the column-side bracket 32 with each other. Thereby, the column-side bracket 32 can be tilted relative to the vehicle body-side bracket 31 about fulcrum bolts 53, 73 provided to the first and second lower support mechanisms 27, 28 within a formation range of the tilt long holes 37 and can be moved along the axial direction of the column shaft 3 within a formation range of the telescopic long holes 41. That is, the steering column 5 is supported by the upper support mechanism 26 so that it can be tilted relative to the fixing member 29 and can be axially moved within the above ranges.

In the meantime, the upper support mechanism 26 is provided with a lock mechanism 44 that holds a position of the steering wheel 6 by operating an operation lever (not shown), which rotates the support axle 33, to thus frictionally engage the respective side plate parts 32a, 35a each other.

As shown in FIG. 2, the first and second lower support mechanisms 27, 28 that are the support mechanisms are respectively arranged at both sides of the steering column 5 in the left-right direction of the vehicle (the left-right direction in FIG. 2). Specifically, the first lower support mechanism 27 is arranged at the right side of the steering column 5 with the worm axle 16 being positioned between the column shaft 3 and the first lower support mechanism and the second lower support mechanism 28 is arranged at the left side of the steering column 5.

The first and second lower support mechanisms 27, 28 have support brackets 51, 71 that connect the fixing member 45 fixed to the vehicle main body and the steering wheel 5 with each other, fulcrum bolts 53, 73 that are inserted into axle holes 52, 72 formed in the support brackets 51, 71 and bushes 54, 74 that are interposed between the axle holes 52, 72 and the fulcrum bolts 53, 73, respectively. In the meantime, since the first and second lower support mechanisms 27, 28 are respectively configured by the same members, the respective members of the first lower support mechanism 27 are described and the respective members of the second lower support mechanism 28 are denoted only with the reference numerals in the parentheses.

As shown in FIG. 2, the support bracket 51 (71) has a flat plate-shaped column-side fastening part 55 (75) having the axle hole 52 formed therein and a vehicle body-side fastening part 56 (76) extending from an end portion of the column-side fastening part 55 (75) in an orthogonal direction and has a substantial L shape. In the meantime, an end portion (a lower end portion in FIG. 2) of the column-side fastening part 55 (75), which is at an opposite side to the vehicle body-side fastening part 56 (76), is formed with a limit part 57 (77) that is provided at an interval in the front-rear direction of the vehicle between the end portion and the housing 17. The limit part 57 (77) is engaged to the housing 17, so that the support bracket 51 (71) is suppressed from rotating about the fulcrum bolt 53 (73) beyond a predetermined range.

Figure 4:
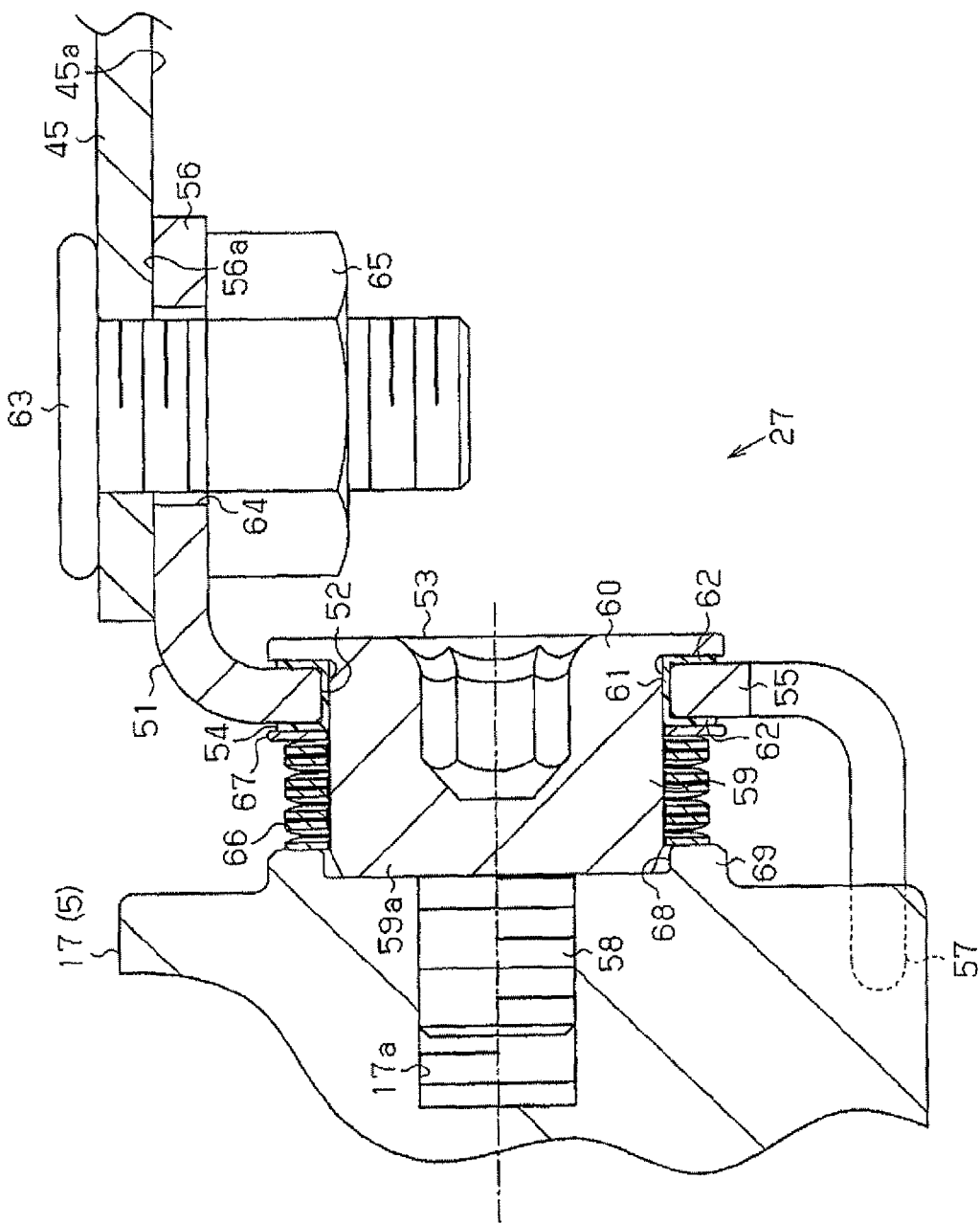
FIG. 4 is an enlarged sectional view showing a vicinity of a first lower support mechanism of the illustrative embodiment.

As shown in FIG. 4 (5), the fulcrum bolt 53 (73) has a screw part 58 (78) that is screwed into a screw hole 17a formed in the housing 17, an axle part 59 (79) on which the bush 54 (74) is fitted and a head part 60 (80) that has an outer diameter larger than an inner diameter of the axle hole 52 (72) and holds the column-side fastening part 55 (75) between the steering column 5 and the head part. The bush 54 (74) has a cylindrical part 61 (81) into which the axle part 59 (79) of the fulcrum bolt 53 (73) is rotatably inserted and a disc-shaped flange part 62 (82) that extends from both ends of the cylindrical part 61 (81) in a diametrically outer direction. Meanwhile, in this illustrative embodiment, the bush 54 (74) is configured by coating a resin material having an excellent sliding ability on a metal mesh becoming a base material.

As shown in FIG. 2, the vehicle body-side fastening part 56 (76) is formed with a fastening hole 64 (84) into which a fastening bolt 63 (83) fixed to the fixing member 45 is inserted. A nut 65 (85) is screwed onto the fastening bolt 63 (83) inserted into the fastening hole 64 (84), so that the support bracket 51 (71) is fastened to the fixing member 45. Also, the fulcrum bolt 53 (73) inserted into the axle hole 52 (72) via the bush 54 (74) is screwed into the screw hole 17a of the housing 17, so that the support bracket 51 (71) is fastened to the steering column 5. Thereby, the steering column 5 is supported so that it can be tilted about the fulcrum bolt 53 (73) (tilt fulcrum) relative to the support bracket 51 (71) fixed to the vehicle main body.

(Axial Force Reduction-Suppression Structure)

In the below, an axial force reduction-suppression structure that suppresses the axial force of the fastening bolt for fastening the support bracket to the fixing member from being reduced is described.

Figure 9:
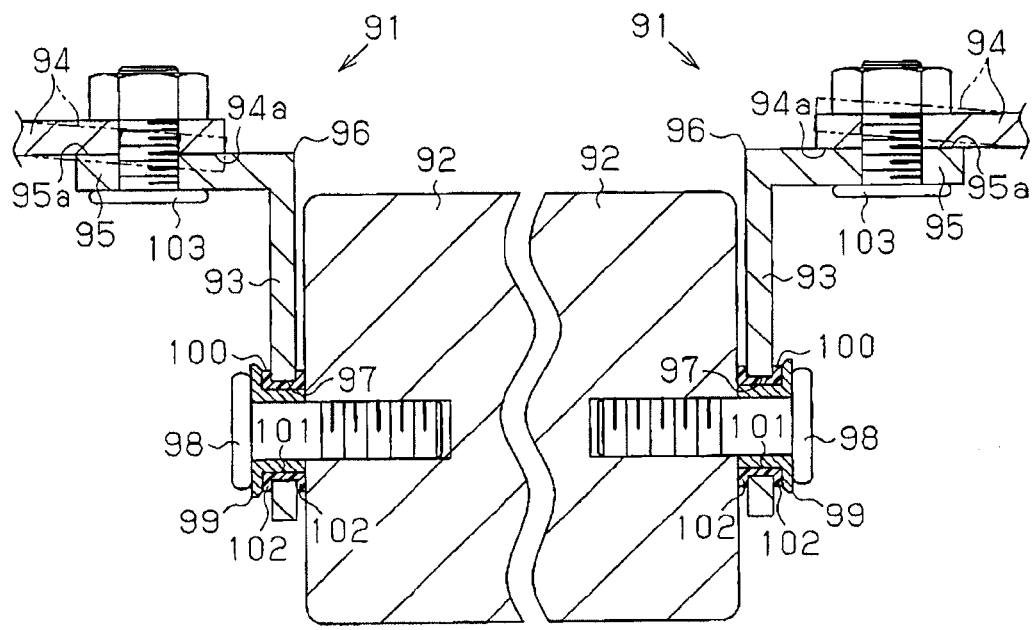
FIG. 9 is an enlarged sectional view of support mechanisms of the related art.

As described above, the fixing member 45 is deviated from a normal position (a position in a case where there is no processing error and the like) due to processing precision, mounting precision and the like, so that a fastening surface 54a facing the vehicle body-side fastening parts 56, 76 becomes non-parallel with (is inclined to) fastening surfaces 56a, 76a facing the fixing member 45 of the vehicle body-side fastening parts 56, 76 located at the normal position (refer to FIG. 9). In this case, when fastening the support brackets 51, 71 to the fixing member 45, the axial force of the fastening bolts 63, 83 is consumed so as to deform the support brackets 51, 71. As a result, the fastening force of the support brackets 51, 71 to the fixing member 45 by the fastening bolts 63, 83 is weakened.

Considering the above, as shown in FIG. 2, the first and second lower support mechanisms 27, 28 have coil springs 66, 86, respectively, each of which is an elastic member that can be compressed in the axial direction of the fulcrum bolts 53, 73 (the left-right direction in FIG. 2). Meanwhile, in this illustrative embodiment, as the coil springs 66, 86, a so-called coiled wave spring is adopted which is formed by winding a band-shaped spring material into a coil shape and is bent into a wave shape continuing along a longitudinal direction of the spring material. The respective support brackets 51, 71 compress the coil springs 66, 86, so that the first and second lower support mechanisms 27, 28 can oscillate relative to the steering column 5.

Specifically, as shown in FIG. 4, the coil spring 66 of the first lower support mechanism 27 is arranged at a side of the column-side fastening part 55 facing the steering column 5 and is held between the column-side fastening part 55 and the steering column 5 with being fitted to the outer periphery of the axle part 59. In the meantime, a disc-shaped spacer 67 is interposed between the flange part 62 of the bush 54 and the coil spring 66.

Figure 5:
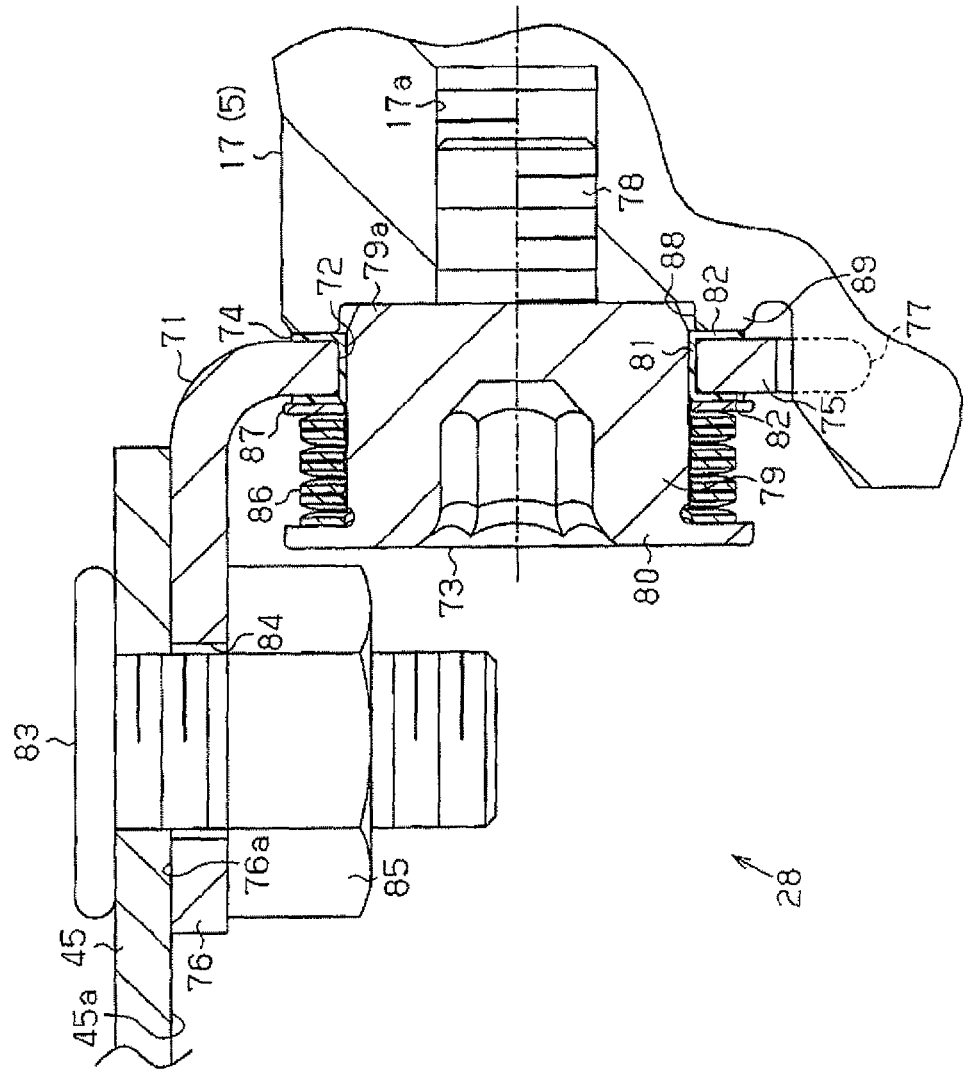
FIG. 5 is an enlarged sectional view showing a vicinity of a second lower support mechanism of the illustrative embodiment.

In the meantime, as shown in FIG. 5, the coil spring 86 of the second lower support mechanism 28 is arranged at a side of the column-side fastening part 75 opposite to the steering column 5 and is held between the column-side fastening part 75 and the head part 80 of the fulcrum bolt 73 with being fitted to the outer periphery of the axle part 79. In the meantime, a disc-shaped spacer 87 is interposed between the flange part 82 of the bush 74 and the coil spring 86. Thereby, the steering column 5 is urged towards the second lower support mechanism 28 by the coil spring 66 and is urged towards the second lower support mechanism 28 via the fulcrum bolt 73 by the coil spring 86, so that it is pressed towards the support bracket 71 provided to the second lower support mechanism 28.

Here, when the axle parts 59, 79 of the fulcrum bolts 53, 73 are mounted to the coil springs 66, 86 without being press-fitted, the coil springs 66, 86 are apt to be separated from the axle parts 59, 79 upon the mounting of the support brackets 51, 71, so that the mounting ability is deteriorated. Considering this point, the coil springs 66, 86 are formed so that the axle parts 59, 79 are press-fitted thereto at a state before the coil springs are compressed (before the support brackets 51, 71 are fastened to the steering column 5). Also, the coil springs 66, 86 are compressed to expand in the diametrically outer direction (the diameters thereof are enlarged). Thereby, the column-side fastening parts 55, 75 are fastened to the steering column 5, so that the coil springs are not press-fitted as regards the axle parts 59, 79.

Figure 6:
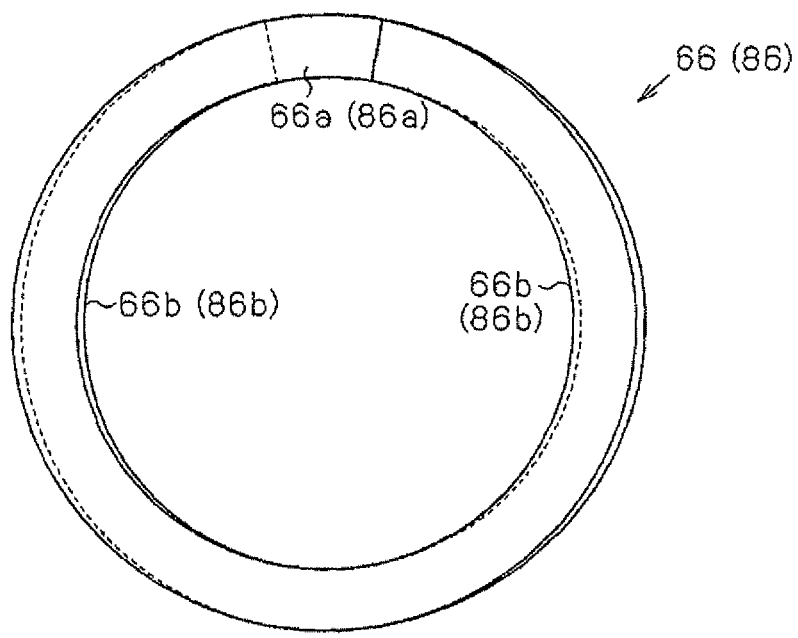
FIG. 6 is a plan view of a coil spring of the illustrative embodiment.

Specifically, as shown in FIG. 6, the coil spring 66 has, when seen from the axial direction thereof, a main body part 66a that is formed by winding a band-shaped spring material along a true circle having an inner diameter slightly larger than an outer diameter of the axle part 59 and a press-fitting part 66b that is wound along an ellipse. In this illustrative embodiment, a long axis of the ellipse configured by the press-fitting part 66b is substantially the same as an inner diameter of the main body part 66a and a short axis thereof is smaller than the outer diameter of the axle part 59. In the meantime, the press-fitting part 66b is formed over a substantially half circumference length from a winding start end portion and a winding completion end portion. Also, the press-fitting part 66b is formed so that as the coil spring 66 is compressed to expand in the diametrically outer direction, a short diameter of the press-fitting part becomes larger than the outer diameter of the axle part 59.

Likewise, the coil spring 86 has a main body part 86a that is wound into a true circle shape and a press-fitting part 86b that is wound into an elliptical shape. Before the compression, the coil spring is press-fitted to the axle part 79 and the column-side fastening part 75 is fastened to the steering column 5 by the fulcrum bolt 73 and thus compressed, so that the coil spring is not press-fitted as regards the axle part 79.

As shown in FIG. 4, the outer diameter of the axle part 59 is larger than that of the screw part 58, and a connection end portion 59a of the axle part 59 with the screw part 58 is tapered. In the meantime, the connection end portion 59a is formed so that a leading end thereof has an inner diameter smaller than the short axis of the press-fitting part 66b. The connection end portion 59a is inserted into a recess part 68 that is formed in the steering column 5. Specifically, the steering column 5 is formed with a disc-shaped protrusion 69 that is arranged on the same axis as the screw hole 17a and has an inner diameter slightly larger than the outer diameter of the axle part 59, and the recess part 68 is formed by the protrusion 69. Also, the inner diameter of the protrusion 69 is smaller than the outer diameter of the coil spring 66 and a leading end of the protrusion 69 abuts on the coil spring 66, so that the coil spring 66 is not inserted into the recess part 68. Hence, in this illustrative embodiment, the protrusion 69 corresponds to a peripheral edge of the recess part 68.

By the above configuration, as shown in FIG. 5, the outer diameter of the axle part 79 is formed to be larger than that of the screw part 79 and a connection end portion 79a of the axle part 79 with the screw part 78 is tapered. The connection end portion 79a is inserted into a recess part 88 that is configured by an annular protrusion 89 formed at the steering column 5. Also, a leading end of the protrusion 89 abuts on the flange part 82 of the bush 74.

The recess parts 68, 88 are formed to have the same depth (a length in the left-right direction in FIGS. 4 and 5). Also, the column-side fastening parts 55, 75 have the same thickness, and the fulcrum bolts 53, 73, the bushes 54, 74, the coil springs 66, 86 and the spacers 67, 87 have the same shapes, respectively. Thereby, a compression amount of the coil spring 66 between the column-side fastening part 55 and the protrusion 69 of the steering column 5 and a compression amount of the coil spring 86 between the column-side fastening part 75 and the head part 80 of the fulcrum bolt 73 are the same, and set loads of the respective coil springs 66, 86 are the same. In the meantime, each of the coil spring 66, 86 is set with a set load capable of sufficiently suppressing the steering column 5 from rattling due to the applied reverse input and the like.

Figure 7:
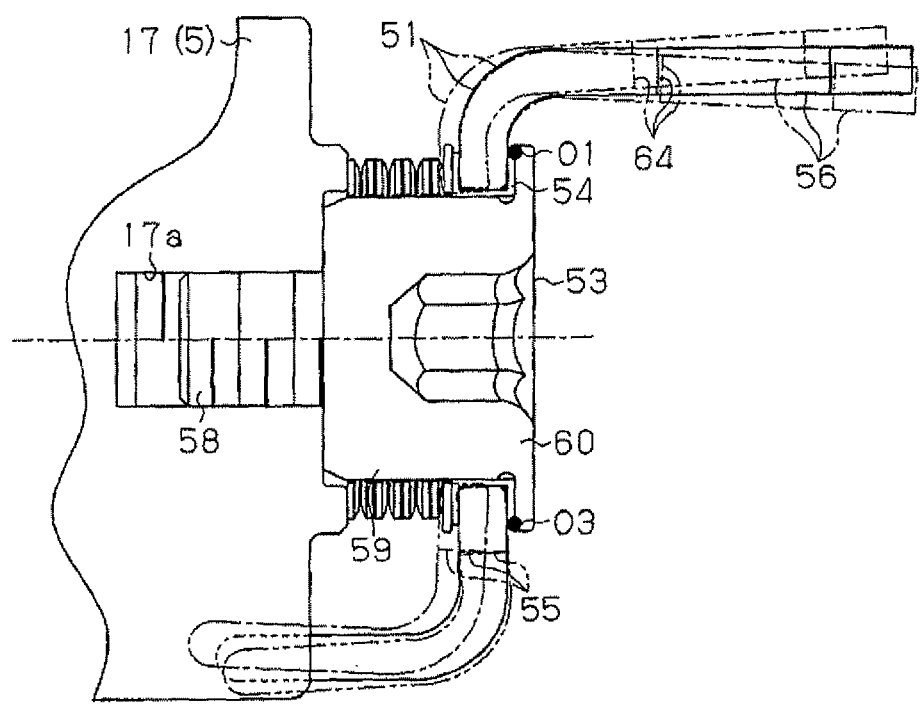
FIG. 7 illustrates an operation of the first lower support mechanism of the illustrative embodiment.
Figure 8:
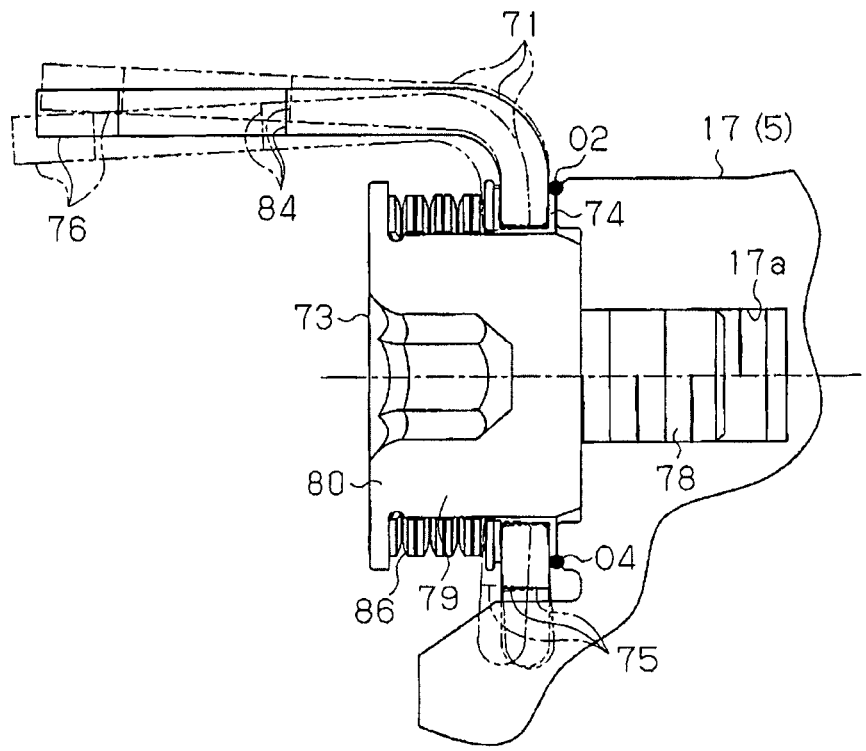
FIG. 8 illustrates an operation of the second lower support mechanism of the illustrative embodiment.

As shown in FIG. 7, the first lower support mechanism 27 configured as described above is adapted to oscillate relative to the steering column 5 as the support bracket 51 axially compresses the coil spring 66. Likewise, as shown in FIG. 8, the second lower support mechanism 28 is adapted to oscillate relative to the steering column 5 as the support bracket 71 axially compresses the coil spring 86. Meanwhile, at this time, only the cylindrical parts 61, 81 of the bushes 54, 74 are deformed between the fulcrum bolts 53, 73 and the column-side fastening parts 55, 75 and the flange parts 62, 82 are not deformed. Also, in FIGS. 7 and 8, a state is shown with the dashed-dotted line in which the support brackets 51, 71 are oscillated in the plane orthogonal to the fastening surfaces 56a, 76a of the vehicle-side fastening parts 56, 76, about contact points serving as fulcrums O1, O2 at which the sides of the column-side fastening parts 55, 75 facing the vehicle body-side fastening parts 56, 76 contact the head parts 60, 80 of the fulcrum bolts 53, 73, and a state is also shown with the dashed-two dotted line in which the support brackets 51, 71 are oscillated about contact points serving as fulcrums O3, O4 at which the sides of the column-side fastening parts 55, 75 opposite to the vehicle body-side fastening parts 56, 76 contact the head parts 60, 80 of the fulcrum bolts 53, 73.

As described above, according to the illustrative embodiment, following effects can be obtained.

(1) The pair of first and second lower support mechanisms 27, 28 has the coil springs 66, 86, which are fitted to the outer peripheries of the axle parts 59, 79 of the fulcrum bolts 53, 73, respectively, and oscillates relative to the steering column 5 as the support brackets 51, 71 compress the coil springs 66, 86. The coil springs 66, 86 are formed so that the axle parts 59, 79 are press-fitted thereto at the state the before the column-side fastening parts 55, 75 are fastened to the steering column 5.

According to the above configuration, even when the fastening surface 45a of the fixing member 45 is deviated from the normal position due to the processing precision and the like, the support brackets 51, 71 axially compress the coil springs 66, 86 and oscillate upon the fastening of the support brackets 51, 71 to the fixing member 45 so that the fastening surfaces 56a, 76a of the vehicle body-side fastening parts 56, 76 are closely contacted to the fastening surface 45a of the fixing member 45. Thereby, it is possible to suppress the deformation of the support brackets 51, 71. Also, at this time, since the coil springs 66, 86 are axially compressed, it is possible to enable the support brackets 51, 71 to oscillate without deforming the flange parts 62, 82 of the cylindrical parts 61, 81 of the bushes 54, 74, unlike the related art. Therefore, it is possible to suppress the axial force of the fastening bolts 63, 83 from being reduced and it is not necessary to make a design reflecting the reduction of the axial force, so that it is possible to reduce the cost. In the above configuration, since the coil springs 66, 86 are formed so that the axle parts 59, 79 are press-fitted thereto, it is difficult for the coil springs 66, 86 to separate from the axle parts 59, 79. Thereby, when mounting the first and second lower support mechanisms 27, 28, it is possible to prevent the coil springs 66, 86 from separating (coming out) from the axle parts 59, 79, thereby improving the mounting ability.

(2) The connection end portions 59a, 79a of the axle parts 59, 79 of the fulcrum bolts 53, 73 with the screw parts 58, 78 are tapered. Hence, it is possible to easily press-fit the axle parts 59, 79 into the coil springs 66, 86 and the bushes 54, 74, thereby further improving the mounting ability. Furthermore, even when the winding start end portion and winding completion end portion of the coil spring 66 are formed with the press-fitting part 66b, it is possible to prevent the fulcrum bolt 53 of the first lower support mechanism 27 from holding the press-fitting part 66b of the coil spring 66 between the protrusion 69 and the fulcrum bolt.

(3) The fulcrum bolts 53, 73 are screwed into the screw hole 17a formed in the steering column 5, so that the column-side fastening parts 55, 75 are fastened to the steering column 5. Also, the coil spring 66 of the first lower support mechanism 27 is arranged between the column-side fastening part 55 and the steering column 5 and the coil spring 86 of the second lower support mechanism 28 is arranged between the column-side fastening part 75 and the head part 80 of the fulcrum bolt 73. The steering column 5 is formed with the recess part 68 into which the connection end portion 59a of the fulcrum bolt 53 is inserted.

According to the above configuration, the steering column 5 is pressed towards the support bracket 71 that is provided to the second lower support mechanism 28. Hence, even when the respective members configuring the first and second lower support mechanisms 27, 28 are worn by the using over the long term and an axial gap is thus caused between the steering column 5 and the support brackets 51, 71, it is possible to suppress the steering column 5 from rattling.

Here, when the tapered connection end portions 59a, 79a are arranged in the bushes 54, 74, the fulcrum bolts 53, 73 may rattle in the bushes 54, 74. In the above configuration, since the steering column 5 is pressed towards the support bracket 71, the bush 74 is arranged at the connection end portion 79a-side of the axle part 79 of the fulcrum bolt 73 and the fulcrum bolt 73 is apt to rattle in the second lower support mechanism 28.

Regarding the above, according to the above configuration, since the connection end portion 79a of the fulcrum bolt 73 is inserted into the recess part 88 formed in the steering column 5, even when the connection end portion 79a is tapered, the fulcrum bolt 73 is difficult to rattle in the bush 74, so that the steering column 5 can be stably supported. Thereby, while stably supporting the support brackets 51, 71, it is possible to easily press-fit the axle parts 59, 79 to the coil springs 66, 86 by tapering the connection end portions 59a, 79a of the respective fulcrum bolts 53, 73.

(4) The coil spring 66 abuts on the peripheral edge (protrusion 69) of the recess part 68 and the recess part 68 is formed to have the same depth as that of the recess part 88 into which the connection end portion 79a of the fulcrum bolt 73 is inserted. The column-side fastening parts 55, 75 are formed to have the same thickness, and the members (the fulcrum bolts 53, 73, the bushes 54, 74, the coil springs 66, 86 and the spacers 67, 87) configuring the first and second lower support mechanisms 27, 28 are formed to have the same shapes, respectively.

Here, in the second lower support mechanism 28, the coil spring 86 is held between the column-side fastening part 75 and the head part 80 of the fulcrum bolt 73. Therefore, when the recess part 88 is formed, the compression amount of the coil spring 86 is increased as the depth of the recess part 88. In this regard, according to the above configuration, since the coil spring 66 abuts on the peripheral edge of the recess part 68 in the first lower support mechanism 27, too, the compression amount of the coil spring 66 is increased as the depth of the recess part 68.

In this regard, according to the above configuration, since the respective recess parts 68, 88 have the same depth, the column-side fastening parts 55, 75 have the same thickness and the members configuring the first and second lower support mechanisms 27, 28 have the same shapes, respectively, the compression amounts (set loads) of the coil springs 66, 86 are the same. Thereby, the members configuring the first and second lower support mechanisms 27, 28 can be commonalized to reduce the cost, and the set loads of the coil springs 66, 86 are made to be the same, so that the steering column 5 can be stably supported.

(5) The coil springs 66, 86 are formed so that the axle parts 59, 79 are not press-fitted thereto at the state where the column-side fastening parts 55, 75 are fastened to the steering column 5. Therefore, compared to a configuration where the axle parts 59, 79 are press-fitted to the coil springs at the state where the column-side fastening parts 55, 75 are fastened to the steering column 5, the coil springs 66, 86 can stably urge the steering column 5, so that it is possible to securely suppress the steering column 5 from rattling due to the applied reverse input and the like.

In the meantime, the above illustrative embodiment can be appropriately changed and implemented as follows.

In the above illustrative embodiment, as shown in FIG. 2, the shape of the support bracket 51 and the shape of the support bracket 71 are different from each other. However, the invention is not limited thereto. That is, the support brackets 51, 71 may be made to have the same shape.

in the above illustrative embodiment, the column-side fastening parts 55, 75 are fastened to the steering column 5 and compressed, so that the axle parts 59, 79 are not press-fitted to the coil springs 66, 86. However, the invention is not limited thereto. For example, the coil springs may be formed so that the axle parts 59, 79 are press-fitted thereto.

In the above illustrative embodiment, the connection end portions 59*a*, 79*a* of the axle parts 59, 79 of the fulcrum bolts 53, 73 are tapered. However, the invention is not limited thereto. For example, only one of the connection end portions 59*a*, 79*a* may be tapered. Also, the axle parts 59, 79 may be formed to have constant diameters, respectively.

In the above illustrative embodiment, the steering column 5 is formed with the recess parts 68, 88 into which the connection end portions 59*a*, 79*a* are inserted. However, the invention is not limited thereto. For example, the steering column 5 may be formed with only any one of the recess parts 68, 88. Also, the steering column 5 may not be formed with the recess parts 68, 88.

In the above illustrative embodiment, the coil spring 66 of the first lower support mechanism 27 is arranged at the side of the column-side fastening part 55 facing the steering column 5 and the coil spring 86 of the second lower support mechanism 28 is arranged at the side of the column-side fastening part 55 opposite to the steering column 5. However, the invention is not limited thereto. For example, the coil spring 66 may be arranged at the side of the column-side fastening part 55 opposite to the steering column 5 and the coil spring 86 may be arranged at the side of the column-side fastening part 55 facing the steering column 5. Also, both the coil springs 66, 86 may be arranged at the side of the column-side fastening part 55 facing the steering column 5 or opposite to the steering column 5.

In the above illustrative embodiment, the axle parts 59, 79 are respectively press-fitted to the coil springs 66, 86 before the compression. However, the invention is not limited thereto. For example, only the coil spring 66 may be formed so that the axle part 59 is press-fitted thereto. Also, only the coil spring 86 may be formed so that the axle part 79 is press-fitted thereto.

In the above illustrative embodiment, the press-fitting parts 66*b*, 86*b* of the coil springs 66, 86 are formed over the substantially half circumference length from the winding start end portion and the winding completion end portion. However, the invention is not limited thereto. For example, the coil springs 66, 86 may be formed so that the entire become the press-fitting parts 66*b*, 86*b*.

In the above illustrative embodiment, the coiled wave springs are adopted as the coil springs 66, 86 serving as the elastic members. However, a typical coil spring in which a spring material extends along a spiral direction may be adopted. Also, the invention is not limited to the coil spring. For example, a disc spring may be adopted as the elastic member insomuch as the axle parts 59, 79 of the fulcrum bolts 53, 73 are press-fitted thereto.

In the above illustrative embodiment, the bushes 54, 74 are configured by coating the resin material to the metal mesh becoming the base material. However, the invention is not limited thereto. For example, the bushes may be made of only the resin material. Also, the bushes 54, 74 may be made of materials other than the resin material insomuch as the support brackets 51, 71 can oscillate.

In the above illustrative embodiment, the column-side fastening parts 55, 75 are fastened to the steering column 5 by the fulcrum bolts 53, 73 that are inserted from both sides in the left-right direction of the vehicle. However, the invention is not limited thereto. For example, the fulcrum bolts 53, 73 may be provided so that the screw parts 58, 78 of the fulcrum bolts 53, 73 protrude from the inside of the steering column 5 towards both sides in the left-right direction of the vehicle and the nuts may be screwed to the screw parts 58, 78, thereby fastening the column-side fastening parts 55, 75 to the steering column 5.

In the above illustrative embodiment, the invention is applied to the steering device having the tilt and telescopic functions. However, the invention is not limited thereto. For example, the invention may be applied to a steering device having only a tilt adjusting function.

In the above illustrative embodiment, the steering device 1 is configured as the electric power steering device (EPS) of a so-called column assist type that applies the assist force to the output axle 14 configuring the column shaft 3. However, the invention is not limited thereto. For example, the invention may be applied to an EPS other than the column assist type, such as a so-called lock assist type, a hydraulic power steering device or a steering device of a non-assist type.

In the below, the technical spirits that can be perceived from the above illustrative embodiment and separate examples are described together with the effects thereof.

(A) In the steering device described in the above (3), the recess part is formed so that the elastic member abuts on the peripheral edge of the recess part, and is formed to have the same depth as that of the recess part to which the connection end portion of the fulcrum bolt provided to the one side is inserted.

Here, in the other support mechanism, the elastic member is held between the column-side fastening part and the head part of the fulcrum bolt. Hence, when the steering column is formed with the recess part, the compression amount of the elastic member is increased as the depth of the recess part. In this regard, in the above configuration, since the elastic member abuts on the peripheral edge of the recess part in the one support mechanism, too, the compression amount of the elastic member is increased as the depth of the recess part. Since the depths of the respective recess parts are the same, the compression amounts (set loads) of the respective elastic members are made to be the same by making the thicknesses of the support brackets (column-side fastening parts) of the respective support mechanisms same and commonalizing the members (fulcrum bolts, elastic members) configuring the respective support mechanisms. Therefore, the members configuring the respective support mechanisms are commonalized to reduce the cost, and the set loads of the elastic members are made to be the same, so that the steering column can be stably supported.

(B) In the steering device described in any one of (1) to (3) and (A), the elastic member is the coil spring and the elastic member is formed so that the axle part is not press-fitted thereto at a state where the column-side fastening part is fastened to the steering column.

That is, the coil spring has a property that it is compressed to expand in the diametrically outer direction (the inner diameter thereof is enlarged). Considering this, in the above configuration, the elastic member is formed so that as it is compressed upon the fastening of the column-side fastening part to the steering column, the axle part is not press-fitted to the elastic member. Hence, compared to a configuration where the axle part is press-fitted to the elastic member at the state where the column-side fastening part is fastened to the steering column, the coil spring can stably urge the steering column, so that it is possible to suppress the steering column from rattling due to the applied reverse input and the like.

Although the invention has been specifically described with reference to the specific illustrative embodiment, it is apparent to one skilled in the art that a variety of changes and modifications can be made without departing from the spirit and scope of the invention.

This application is based on Japanese Patent Application No. 2011-001471 filed on Jan. 6, 2011, the disclosures of which are incorporated herein by way of reference.

Industrial Applicability

According to the invention, it is possible to a steering device capable of suppressing an axial force of a fastening bolt from being reduced.

REFERENCE SIGNS LIST

1: steering device
2: steering shaft
5: steering column
6: steering wheel
17a: screw hole
29, 45: fixing member
45a, 56a, 76a: fastening surface
51, 71: support bracket
52, 72: axle hole
53, 73: fulcrum bolt
54, 74: bush
55, 75: column-side fastening part
56, 76: vehicle body-side fastening part
57, 77: limit part
58, 78: screw part
59, 79: axle part
59a, 79a: connection end portion
60, 80: head part
61, 81: cylindrical part
62, 82: flange part
63, 83: fastening bolt
64, 84: fastening hole
65, 85: nut
66, 86: coil spring
66a, 86a: main body part
66b, 86b: press-fitting part
67, 87: spacer
68, 88: recess part
69, 89: protrusion
O1, O2, O3, O4: fulcrum

The invention claimed is:

1. A steering device comprising:
a steering column that rotatably supports a steering shaft to which a steering wheel is connected; and
a pair of support mechanisms that tiltably supports the steering column relative to a vehicle main body,
wherein each of the support mechanisms includes:
a support bracket having a column-side fastening part that is tiltably fastened to the steering column and a vehicle body-side fastening part that is fastened to a fixing member fixed to the vehicle main body;
a fulcrum bolt that is inserted into an axle hole formed in the column-side fastening part, becomes a fulcrum upon tilting of the steering column, and fastens the column-side fastening part to the steering column; and
a bush that is interposed between the fulcrum bolt and the axle hole,
wherein the vehicle body-side fastening part is formed with a fastening hole into which a fastening bolt for fastening the support bracket to the fixing member is inserted,
wherein each of the support mechanisms includes an elastic member that is fitted to an outer periphery of an axle part of the fulcrum bolt, and is configured to oscillate relative to the steering column as the support bracket compresses the elastic member in an axial direction of the fulcrum bolt, and
wherein the elastic member that is provided to at least one of the support mechanisms is formed so that the axle part is press-fitted thereto at a state before the column-side fastening part is fastened to the steering column.

2. The steering device according to claim 1,
wherein the axle part of the fulcrum bolt that is provided to at least one of the respective support mechanisms is formed to have an outer diameter larger than that of a screw part of the fulcrum bolt, and
wherein a connection end portion of the axle part with the screw part is tapered.

3. The steering device according to claim 2,
wherein the fulcrum bolt is screwed into a screw hole formed in the steering column so as to fasten the column-side fastening part to the steering column,
wherein the elastic member that is provided to one of the support mechanisms is arranged between the column-side fastening part and the steering column, and the elastic member that is provided to the other of the support mechanisms is arranged between the column-side fastening part and a head part of the fulcrum bolt,
wherein the connection end portion of the fulcrum bolt that is provided to each support mechanism is tapered, and
wherein the screw hole of the steering column is formed at a surrounding thereof with a recess part into which the connection end portion of the fulcrum bolt provided to the other of the support mechanisms is inserted.

* * * * *